(12) United States Patent
Ling et al.

(10) Patent No.: US 7,479,892 B2
(45) Date of Patent: Jan. 20, 2009

(54) DETECTION OF UNINTENDED LANE DEPARTURES

(75) Inventors: Fredrik Ling, Stockholm (SE); Fredrik Billberg, Älvsjö (SE)

(73) Assignee: Scania CV AB (publ) (SE)

( * ) Notice: Subject to any disclaimer, the term of this patent is extended or adjusted under 35 U.S.C. 154(b) by 108 days.

(21) Appl. No.: 10/571,037

(22) PCT Filed: Aug. 31, 2004

(86) PCT No.: PCT/EP2004/051967

§ 371 (c)(1),
(2), (4) Date: Apr. 24, 2006

(87) PCT Pub. No.: WO2005/023588

PCT Pub. Date: Mar. 17, 2005

(65) Prior Publication Data

US 2007/0024430 A1  Feb. 1, 2007

(30) Foreign Application Priority Data

Sep. 8, 2003  (DE) ................. 103 41 366

(51) Int. Cl.
*G08B 23/00* (2006.01)
(52) U.S. Cl. .............. 340/576; 340/436; 340/575; 340/903; 701/301
(58) Field of Classification Search ............ 340/576, 340/575, 435, 436, 438, 465, 903; 701/41, 701/70, 301
See application file for complete search history.

(56) References Cited

U.S. PATENT DOCUMENTS

| 5,642,093 | A | * | 6/1997 | Kinoshita et al. | 340/439 |
|---|---|---|---|---|---|
| 5,982,278 | A | | 11/1999 | Cuvelier | |
| 6,317,692 | B2 | * | 11/2001 | Kodaka et al. | 701/301 |
| 6,324,452 | B1 | * | 11/2001 | Ikegaya | 701/41 |
| 6,370,475 | B1 | * | 4/2002 | Breed et al. | 701/301 |
| 6,748,302 | B2 | * | 6/2004 | Kawazoe | 701/1 |
| 7,091,838 | B2 | * | 8/2006 | Shimakage | 340/436 |
| 7,236,884 | B2 | * | 6/2007 | Matsumoto et al. | 701/300 |
| 7,269,493 | B2 | * | 9/2007 | Uemura et al. | 701/70 |

FOREIGN PATENT DOCUMENTS

| DE | 103 11 518 A | 11/2003 |
|---|---|---|
| EP | 0 960 775 A | 12/1999 |
| EP | 1 074 430 A1 | 2/2001 |
| EP | 1 143 403 A | 10/2001 |

OTHER PUBLICATIONS

European Search Report PCT/EP2004/051967 dated Dec. 29, 2004.

* cited by examiner

*Primary Examiner*—Davetta W Goins
(74) *Attorney, Agent, or Firm*—Ostrolenk, Faber, Gerb & Soffen, LLP

(57) ABSTRACT

A method and a system for automatically detecting unintended lane departures of vehicles are described. A lane departure warning system comprises a lane departure recognition unit (10), an alarm generation unit (12), and a driver activity monititoring unit (14). The driver activity monitoring unit (14) is configured to monitor one or more vehicle-related parameters like the steer angle that change continuously in response to a control intervention of a driver. The alarm generation unit (12) generates an alarm if an actual or forthcoming lane departure is detected and if additionally an evaluation of the one or more parameters indicates a low or no driver activity.

14 Claims, 1 Drawing Sheet

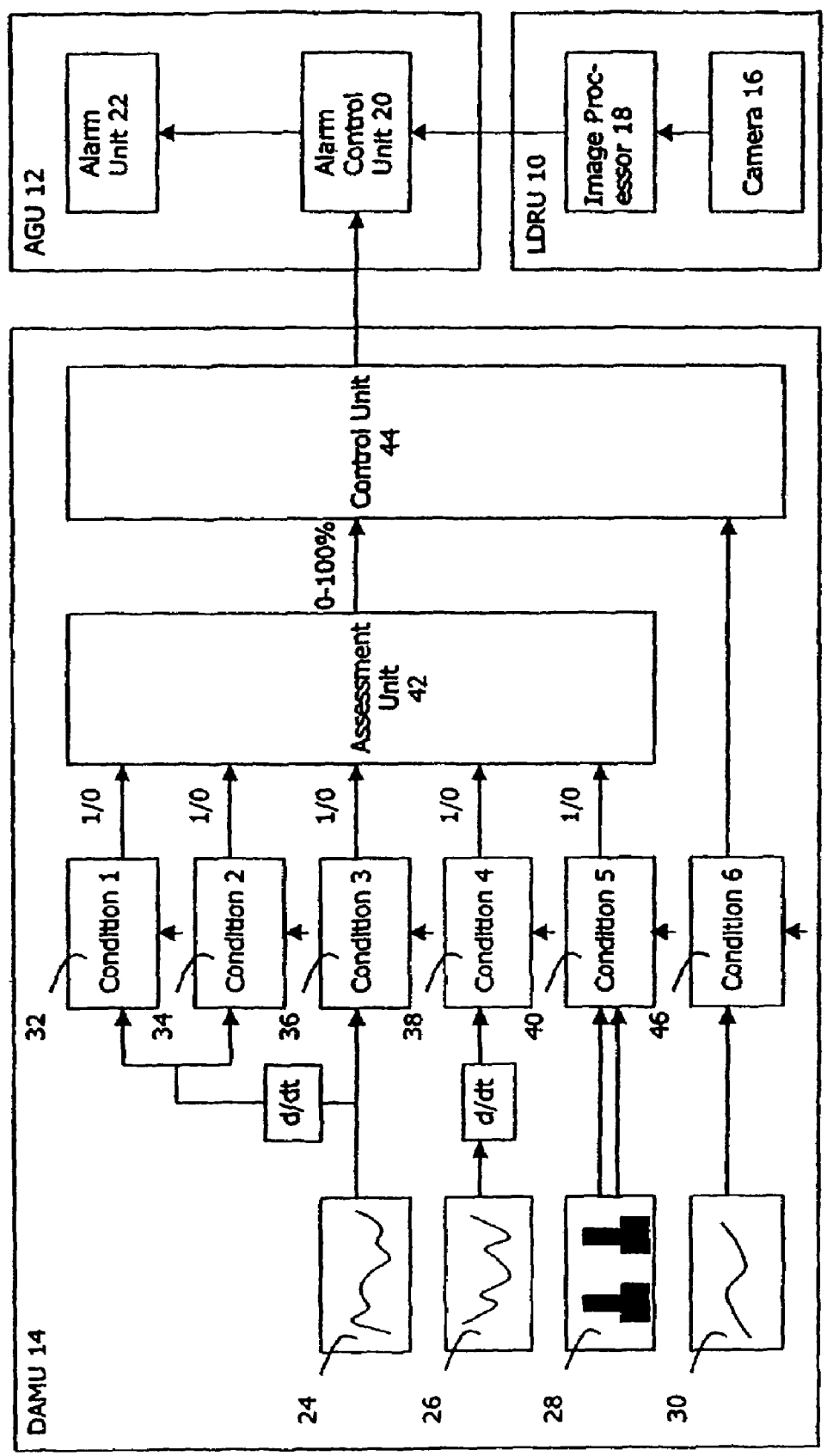

DETECTION OF UNINTENDED LANE DEPARTURES

CROSS REFERENCE TO RELATED APPLICATION

The present application is a 35 U.S.C. §§ 371 national phase conversion of PCT/EP2004/051967, filed 31 Aug. 2004, which claims priority of German Application No. 103 41 366.9, filed 8 Sep. 2003. The PCT International Application was published in the English language.

FIELD OF THE INVENTION

The present invention relates to vehicle safety systems. More specifically, the invention relates to preventing unintended lane departures of vehicles such as trucks and passenger cars.

BACKGROUND OF THE INVENTION

Unintended lane departure is one of the main factors for fatal accidents. There are many causes for unintended lane departure: the destraction of talking on a cell phone, inattention while changing the radio, or falling asleep at the wheel.

Conventional lane departure warning systems as described for example in EP 1 074 430 A1 are configured to recognize the difference between the road and lane markings on the road. Such systems include a camera for tracking the visible lane markings and an image processor to determine the vehicle position relative to the road lane. When a vehicle crosses or is about to cross the lane marking, the lane departure warning system automatically provides a warning to the driver of the vehicle.

The object underlying the invention is to provide a lane departure warning environment that is capable of reliably distinguishing between intended and unintended lane departures to avoid false warnings when a lane marking is crossed consciously.

SUMMARY OF THE INVENTION

According to one aspect of the invention a method is provided for automatically detecting unintended lane departures of vehicles. The method comprises monitoring the occurrence of actual or forthcoming lane departures, monitoring one or more vehicle-related parameters that change continuously in response to a driver's control intervention, and generating an alarm signal if an actual or forthcoming lane departure is detected and if an evaluation of the one or more parameters indicates low or no driver activity.

The decision whether or not to generate an alarm signal upon detection of a lane departure is thus made dependent on an assessment of the driver's activity. If the driver is found to be active, no alarm signal is generated when a lane marking is crossed or when any other criteria indicative of a lane departure is fulfilled.

The evaluation of the driver's activity is based on one or more continuously changing vehicle-related parameters such as a steering behavior, pedal travel or a change of the vehicle's velocity, i.e. an acceleration or deceleration of the vehicle. The evaluation of a continuously changing parameter allows a flexible and thus more reliable decision if a detected lane departure is Intended or not. Furthermore, the evaluation of a continuously changing parameter facilitates the implementation of adaptation mechanisms. It should be noted that in accordance with the present invention the term continuously changing parameter also encompasses quasi-continuous multi-state parameters, i.e. non-binary parameters that can assume a plurality of Individual states.

Various criteria may be assessed to obtain clues about the activity of the driver. Driver activity may for example be assumed If the one or more continuously changing parameters indicate only a slow or slight control intervention or even the absence of any control intervention. Hence, a constant vehicle velocity or only slight steering activities may be indicative of a passive driver. As regards the steering activities, various continuously changing parameters including a steer angle, an angular velocity of the steering wheel and the sign of the angular velocity of the steering wheel may be monitored and evaluated.

The decision whether or not an alarm signal is to be generated upon detection of an actual or forthcoming lane departure may be based on the evaluation of a single parameter or on the evaluation of a plurality of different parameters. As mentioned above, the plurality of different parameters includes at least one parameter that changes continuously in response to a control intervention. In the case that a plurality of parameters are monitored, the individual parameters may be separately evaluated and the individual evaluation results may be assessed in combination to determine driver activity. The result of the assessment may be a non-binary degree of activity.

In addition to the continuously changing parameters described above one or more additional parameters may be monitored and evaluated to avoid false warnings. Such additional parameters may for example include parameters that have only two states (such as a turn signal, which can either be on or off) or that are not or not directly related to driver activity such as a lateral vehicle velocity. In order to determine whether in the case of a lane departure the alarm signal has to be generated, both the degree of activity described above and the further parameters that are not or not directly related to a control intervention may be assessed.

The monitored parameters may be evaluated in various ways. It may for example be determined whether or not a monitored parameter fulfils a predefined condition, such as a threshold condition. The result of the evaluation of a particular monitored parameter may be a binary value indicating whether or not the predefined condition is fulfilled.

According to the invention a functionality may be provided that includes adapting the evaluation process. The evaluation process may for example be adapted by changing the one or more predefined conditions as required to reduce false warnings. The adaptation may be performed taking into account at least one of an individual driving style, external conditions and vehicle conditions.

The present invention may be implemented as software, as one or more pieces of hardware, or as a combination thereof. Hence, according to a further aspect of the invention a computer program product with program code portions for performing the individual steps of the invention when the computer program product is run on a computing device is provided. The computer program product may be stored on a computer readable recording medium.

As regards a hardware solution, a lane departure warning system for vehicles is provided. The system comprises a lane departure recognition unit for recognizing actual or forthcoming lane departures, a driver activity monitoring unit for monitoring one or more vehicle-related parameters that change continuously in response to a control intervention of a driver, an alarm unit, and an alarm control unit for activating the alarm unit if an actual or forthcoming lane departure is detected and If an evaluation of the one or more parameters indicates low or no driver activity.

The driver activity monitoring unit may include a sensor coupled to a steering wheel of the vehicle to monitor the driver's steering behavior. Additionally or alternatively, further sensors may be provided such as a speed sensor, one or more pedal sensors and the like.

The lane departure recognition unit may be configured in various ways. It may for example be configured as an optical system including image processing capabilities as described in EP 1 074 430 A1. Such optical systems detect lane markings and the position of the vehicle relative to the lane markings. However, the lane departure recognition unit need not necessarily be configured as an optical system. It may also be based on other mechanisms like evaluating the lateral velocity of the vehicle.

BRIEF DESCRIPTION OF THE DRAWING

Further aspects and advantages of the invention will become apparent upon studying the following detailed description of a preferred embodiment in conjunction with the accompanying drawing. The drawing schematically shows a block diagram of a lane departure warning system according to the present invention.

DESCRIPTION OF A PREFERRED EMBODIMENT

In the following, a preferred embodiment of the present invention is described with reference to the block diagram of the single FIGURE.

The lane departure warning system shown in the single FIGURE comprises three individual sub-systems, namely a lane departure recognition unit LDRU 10, an alarm generation unit AGU 12 and a driver activity monitoring unit DAMU 14. In the present embodiment, the LRDU 10 is configured as an imaging system that includes a camera 16 and an image processor 18. The camera 16 is mounted to the windshield, dashboard or overhead of the vehicle and tracks visible lane markings on the road. The image information generated by the camera 16 is fed to the image processor 18 that determines when the vehicle drifts toward a lane crossing. When this occurs, the image processor 18 outputs a control signal to the AGU 12.

The AGU 12 comprises an alarm control unit 20 and an alarm unit 22. The alarm control unit 20 is fed with signals from both the DAMU 14 and the LDRU 10. Upon receipt of a control signal indicating an actual or forthcoming lane departure from the LDRU 10 and an enable signal from the DAMU 14, the alarm control unit 20 activates the alarm unit 22. Upon activation, the alarm unit 22 outputs an alarm informing the driver about an unintended lane departure. The alarm unit 22 may be configured to optically, acoustically and/or haptically warn the driver.

In the following, the generation of the enable signal fed by the DAMU14 to the alarm control unit 20 of the AGU12 will be described in more detail.

As becomes apparent from the single FIGURE, the DAMU 14 includes a plurality of sensors 24, 26, 28, 30 for monitoring various vehicle-related parameters that are to be individually evaluated. Particularly, the DAMU 14 includes a steer sensor 24 coupled to the vehicle's steering wheel and outputting a signal indicative of the current steer angle. Moreover, a speed sensor 26 is provided for monitoring the vehicle speed and outputting a sensor signal indicative of the current speed of the vehicle. Additionally, one or more pedal sensors 28 monitor any pedal actuations by the driver and output pedal actuation signals once a pedal such as the brake pedal, the accelerator pedal and/or the clutch pedal have/has been pressed. A further sensor 30 monitors the lateral vehicle velocity and outputs a sensor signal indicative of the lateral velocity of the vehicle. If required, individual ones of the sensors 24, 26, 28, 30 may be omitted or further sensors such as a motor condition sensor may be provided. Also, input ports for additional or alternative parameters to be monitored and evaluated may be provided. Hence, the DAMU 14 may for example include an input port (not shown) for a signal indicative of the state (on/off) of a turn signal, an input port (not shown) for receiving time information, etc.

While the lateral velocity monitored by the sensor 30 is not directly related to a control intervention of a driver, the further sensors 24, 26, 28 are provided to monitor parameters that change in response to such a control intervention. More specifically, the steer sensor 24 and the speed sensor 26 monitor continuously changing parameters associated with a driver's control intervention, while the pedal sensors 28 in the present embodiment monitor binary parameters that have only two discrete states (pedal pressed/not pressed). Alternatively, the pedal sensors 28 could be configured as sensors monitoring pedal travel, i.e. a continuously changing parameter. In such a case the output signals of pedal sensors 28 indicate how far a pedal has been pressed. Pedal travel may be monitored in percent, where 100% means that the pedal is fully pressed, 50% means that the pedal is pressed half way, 0% means that the pedal is not pressed, etc.

One or more of output signals of the individual sensors 24, 26, 28, 30 may be further processed as required to obtain parameters that are actually indicative of driver activity. Such a further processing may for example include differentiation of a sensor signal. In the embodiment depicted in the single FIGURE, the output signals of the speed sensor 26 and of the steer sensor 24 are differentiated to obtain parameters further or better characterizing driver activity. In this context it should be noted that the absolute vehicle speed is not indicative of driver activity because it may simply be set to a specific value by the vehicle's cruise control. However, a change of the vehicle velocity, i.e. an acceleration or a deceleration, is clearly indicative of the driver's activeness. Thus, the signal of the speed sensor 26 is differentiated prior to an evaluation. On the other hand the output signal of the steer sensor 24, i.e. the steer angle as such, is indicative of either an active or passive behavior of the driver. A large steer angle is clearly associated with an active driver.

As becomes apparent from the single FIGURE, the individual sensors 24, 26, 28 monitor a plurality of different parameters indicative of a control intervention. These parameters, or parameters derived therefrom, are separately evaluated by evaluation units 32, 34, 36, 38, 40 individually assigned to the monitored parameters. Each of the individual evaluation units 32 to 40 evaluates a specific one of the monitored parameters and determines whether or not the monitored parameter fulfils an activity-related predefined condition. In the present embodiment, the evaluation results are output as binary values (condition fulfilled/not fulfilled) to an assessment unit 42 that will be described in more detail later.

In the following, the various conditions that are checked by the evaluation units 32 to 40 will be explained. The first evaluation unit 32 receives a signal indicative of the temporal derivative of the steer angle monitored by the steer sensor 22. In other words, the first evaluation unit 32 receives an input signal characteristic of the angular velocity of the steering wheel. The first evaluation unit 32 evaluates the absolute value of the angular velocity of the steering wheel to determine if the steering wheel is held still or if it is rotated in any direction. The driver is considered to be passive if the absolute value of the angular velocity of the steering wheel is below a reference value $\omega_p$ for a predefined period of time $T_p$. Thus, the first evaluation unit 32 applies a threshold decision to determine whether the driver is active or not. If the threshold condition is fulfilled, i.e. if the driver is considered to be passive, the output port of the first evaluation unit 32 is high ("1"). Otherwise it is low ("0").

The second evaluation unit 34 receives the same input signal as the first evaluation unit 32, but evaluates the sign of the angular velocity of the steering wheel to determine if the steering wheel is rotated in one direction or the other. The time interval between two successive points at which the angular velocity of the steering wheel switches signs is continuously measured. The measured values are indicative of the driver's steering frequency. The driver is considered to be passive if the steering frequency is below a predefined value fp. If this threshold condition is fulfilled, the out-put port of the second evaluation unit 34 is high ("1"), indicating a passive driver. According to a preferred variant, the output port of the second evaluation unit 34 goes high only if a predefined number of consecutively measured values indicates slow control interventions, i.e. a passive steering behavior.

The third evaluation unit 36 directly evaluates the steer angle that is output by the steer angle sensor 24. The driver is considered to be passive if the absolute value of the steer angle is below a reference value $V_a$. If this threshold condition is fulfilled, the output port of the third evaluation unit 36 goes high ("1"), indicating a passive driver.

The fourth evaluation unit 38 evaluates the change of the vehicle velocity, i.e. an acceleration or deceleration of the vehicle. If the absolute value of the velocity change exceeds a reference value $a_p$, the driver is considered to be active for a predefined period of time. In this case the output port of the fourth evaluation unit 38 will go low ("0") for this predefined period of time, i.e. if the driver is considered to be active. Otherwise, the output port will be high ("1").

The fifth evaluation unit 40 evaluates whether or not the driver presses any pedal. In the case a pedal is pressed, the output port of the fifth evaluation unit 40 goes low ("0") for a predefined period of time, indicating a control intervention of the driver. If no pedal has been pressed during a longer period of time, the output port of the fifth evaluation unit 40 will be high ("1"). If alternatively the pedal travel is monitored, the fifth evaluation unit 40 may additionally perform a threshold decision. This means that the output port of the fifth evaluation unit 40 only goes low for a predefined period of time if for example the monitored pedal travel indicates that one pedal has been pressed more than half way.

The binary output signals of the individual evaluation units 32 to 40 are fed to the assessment unit 42. The assessment unit 42 weights the individual signals received from the evaluation units 32 to 40 as required and outputs a non-binary signal indicative of the degree of driver activity (0-100%).

The output signal of the assessment unit 42 is fed to a control unit 44, which further receives an input signal from a sixth evaluation unit 46. The sixth evaluation unit 46 evaluates the output signal of the lateral velocity sensor 30 and generates a corresponding binary or non-binary output signal that is input to the control unit 44. Based on the one hand on the output signal of the sixth evaluation unit 46 that is not directly related to a control intervention of the driver, i.e. not directly related to the driver's activity, and on the other hand on the output signal of the assessment unit 42 indicative of a degree of driver activity, the control unit 44 determines whether or not to generate the enable signal. As has been mentioned above, the enable signal controls the alarm control unit 14 to activate the alarm unit 16 upon detection of an actual or forthcoming lane departure by the LDRU 12.

The control unit 44 generates the enable signal if the signal from the assessment unit 42 is indicative of a low or no driver activity and if the signal received from the sixth evaluation unit 46 is not in contradiction to this assessment. Such a contradiction may for example occur when the lateral velocity is very high while the degree of activity determined by the assessment unit 42 is low.

Otherwise, i.e. if high driver activity can correctly be assumed, a disable signal is fed to the alarm control unit 14. The disable signal prevents the alarm control unit 14 from activating the alarm unit 16 upon detection of an actual or forthcoming lane departure by the LDRU 12. Thus, false warnings can be reliably avoided.

In order to enable an adaptation of the DAMU to individual driving styles or particular conditions, each of the individual evaluation units 32 to 40 and 46 includes a further input port that allows to adapt the one or more evaluation criteria. Thus, the lane departure warning system according to the present invention may be adapted to individual driver styles including preferred vehicle speeds, wobbling on the road and the intentional crossing of lane boundaries. Also, the system may be adapted in accordance with external circumstances such as time of the day and lane width. Thus, the conditions relating to driver activity may be changed to require more control intervention during night time. Additionally or alternatively, the system may be adapted to vehicle conditions such as the vehicle weight or the position of a support axle.

Having thus described a preferred embodiment of a lane departure warning system and a method of automatically detecting unintended lane departures, it should be apparent to those skilled in the art that various modifications, adaptations, and alternative embodiments of the invention may be made without departing from the scope and spirit of the present invention. The invention is further defined by the following claims.

The invention claimed is:

1. A method of automatically detecting unintended roadway lane departures of a moving vehicle, comprising:
   monitoring the occurrence of actual or forthcoming lane departures by the vehicle;
   monitoring a plurality of vehicle-related parameters that may change continuously in response to a control intervention or activity of a driver;
   separately evaluating each of the plurality of vehicle-related parameters;
   assessing individual results of the separate evaluations in combination to determine if driver activity is at least low; and
   generating an alarm signal if
   a) an actual or forthcoming lane departure is detected and
   b) if an evaluation of the one or more parameters indicates low or no driver activity.

2. The method of claim 1, further comprising assuming driver activity if the one or more of the parameters indicate only a slow or slight control intervention.

3. The method of claim 1, wherein the one or more parameters are respectively indicative of at least one of a steering behavior of the driver, a pedal travel caused by the driver and a change of a vehicle velocity.

4. The method of claim 3, wherein the one or more parameters indicative of the steering behavior include at least one of a steer angle, an angular velocity of the steering wheel and the sign of the angular velocity of the steering wheel.

5. The method of claim 1, wherein the result of the assessment is a non-binary degree of activity.

6. The method of claim 1, further comprising monitoring and evaluating one or more further vehicle-related parameters that are not or not directly related to driver activity.

7. The method of claim 6, further comprising assessing both the degree of activity and the further parameters that are not related to driver activity to determine whether or not in the case of a lane departure or a forthcoming lane departure the alarm signal has to be generated.

8. The method of claim 6, wherein the one or more parameters that are not or not directly related to driver activity include a lateral velocity of the vehicle.

9. The method of claim 1, wherein the evaluation of a monitored parameter includes determining whether or not a predefined condition is fulfilled.

10. The method of claim 1, further comprising adapting the evaluation in accordance with at least one of an individual driving style, external conditions and vehicle conditions.

11. A computer readable recording medium storing a program of instruction for causing a computer to execute steps of
monitoring the occurrence of actual or forthcoming lane departures by a vehicle;
monitoring a plurality of vehicle-related parameters that may change continuously in response to a control intervention or activity of a driver;
separately evaluating each of the plurality of vehicle-related parameters;
assessing individual results of the separate evaluations in combination to determine if driver activity is at least low; and
generating an alarm signal if
a) an actual or forthcoming lane departure is detected and
b) if an evaluation of the one or more parameters indicates low or no driver activity.

12. A lane departure warning system for vehicles, comprising:
a lane departure recognition unit supported to be able to and being operable for recognizing actual or forth-coming lane departures;
a driver activity monitoring unit for monitoring one or more vehicle-related parameters that change continuously in response to a control intervention of a driver and for evaluating the parameters;
an alarm unit; and
an alarm control unit operable for activating the alarm unit if an actual or forthcoming lane departure is detected by the monitoring and if an evaluation of the one or more parameters in combination indicates low or no driver activity.

13. The lane departure warning system of claim 12, wherein the driver activity monitoring unit includes a sensor that is coupled to a steering wheel of the vehicle.

14. The lane departure warning system of claim 12, wherein the lane departure recognition unit includes an image processor.

* * * * *